3,547,655
METHOD FOR IMPROVING YEAST-RAISED BAKED PRODUCTS
William H. Knightly and Gabriel P. Lensack, Wilmington, Del., assignors to Atlas Chemical Industries, Inc., Wilmington, Del., a corporation of Delaware
No Drawing. Filed Sept. 18, 1967, Ser. No. 668,664
Int. Cl. A21d 2/16
U.S. Cl. 99—91                     7 Claims

ABSTRACT OF THE DISCLOSURE

A yeast-raised baked product containing an emulsifier blend comprising a monoglyceride and an ethoxylated fatty acid ester of a hexitol, a hexitan or an isohexide. In the preparation of the final baked product the emulsifier may be carried by the shortening or added directly to the dough or sponge in the batch method of preparation or to the liquid brew or sponge in the continuous bread-making process.

---

This invention relates to yeast-raised baked products. More particularly, this invention relates to yeast-raised baked products containing emulsifier which conditions the dough prior to the baking of the product and which inhibits the staling of the finished baked product. This invention further relates to methods of preparing yeast-raised baked products, including processes of continuous bread-making.

The "staling" of bread and similar yeast-leavened products is commonly believed to comprise chemical and physical changes which occur in the finished product upon storage under normal conditions until used. The factors contributing to such chemical and physical changes in the finished product are known to be complex and varied; even yet, not all of the contributing factors are completely understood. Whatever may be the causes of the "staling" of yeast-raised baked goods upon storage, however, it is known that the incorporation of certain emulsifiers into the dough prior to baking will retain softness of the finished product, i.e., will retard staling. Moreover, such agents frequently improve the dough condition which facilitates the handling of the dough in the baking process. Notwithstanding that known antistaling agents exists and are normally used in the production of yeast-raised baked goods, notably the monoglycerides, or more commonly, a mixture of mono- and diglycerides, an anitstaling and dough conditioning agent is desired which may be used at reduced levels or concentrations in the preparation of the baked product to produce comparable or superior results in the finished product and which is adaptable to both the batch and continuous bread-making processes.

It is, accordingly, an object of the present invention to provide means for producing yeast-raised baked goods having superior anti-staling characteristics.

It is another object of the present invention to provide a yeast-raised baked product containing an emulsifier composition which effectively conditions the dough of yeast-raised baked goods prior to baking to facilitate handling thereof.

It is another object of the present invention to provide a yeast-raised baked product containing an emulsifier composition suitable for use in the continuous production of bread which excellently conditions the bread dough formed therein to improve its workability in the process and which effectively retards the staling of the final baked product.

It is another object of the present invention to provide a yeast-raised baked product containing an emulsifier composition for use in either the batch or the continuous bread-making process which has the effect of improving the texture of the final baked product.

All of the foregoing objects and still further objects of the present invention may be accomplished by adding to the ingredients of a yeast-leavened baked product a novel blend of emulsifiers which is characterized by the presence of a lipophilic emulsifier and a hydrophilic emulsifier.

The yeast-raised baked products which are contemplated for preparation in accordance with this invention and are embraced within its purview comprise bread and bread-like products which normally contain not more than about 5% by weight of shortening and not more than about 8% by weight of residual (unfermented) sugar.

The lipophilic emulsifier which is a constituent of the emulsifier blend used in accordance with the present invention is comprised by a class of monoesters of mixed monoesters and diesters of glycerine and a fatty acid, hereinafter referred to simply as "monoglycerides." In general, any monoglyceride may be used as a constituent of the emulsifier blend used in accordance with the method of the present invention. However, although all are functional, it is preferred, for convenience of handling only, to use those monoglycerides having an iodine value within the range of about 30 to about 50. Typical monoglyceride compositions suitable for use in accordance with the present invention are, for example, a mixture of monoglycerides and diglycerides (ca. 55% alpha mono) formed from fatty acids from a blend of cottonseed oil and fully hydrogenated cottonseed oil, having an iodine value of about 71, a mixture of monoglycerides and diglycerides (ca. 56% alpha mono) formed from fatty acids from a blend of lard and tallow having an iodine value of about 47 and a mixture of monoglycerides and diglycerides (ca. 56% alpha mono) formed from fatty acids from partially hydrogenated tallow having an iodine value of about 35.

The fatty acid monoglycerides suitable for use in accordance with this invention may be prepared by conventional methods of glycerolysis of edible fats and oils, i.e., by reacting glycerine with a fatty acid glyceride or other fatty acid ester, or by directly esterifying glycerine with a fatty acid having from about 12 to about 22 carbon atoms. Examples of the fatty acid monoglycerides which may be used as the monoglyceride constituent of the emulsifier blend of the present invention are glycerol monostearate, glycerol monooleate and glycerol monopalmitate. While monoglycerides may be used alone, the monoglycerides and diglycerides are generally so closely associated and so difficult to separate that ordinarily mixtures of monoglycerides and diglycerides are used as the active monoglyceride constituent of the emulsifier blend used in accordance with the method of this invention. Throughout this specification, the term "monoglyceride" is used to denote not only the monoglyceride alone but mixtures of monoglycerides and diglycerides as well.

The hydrophilic emulsifier which is a constituent of the emulsifier blend used in accordance with this invention is comprised by a class of ethoxylated fatty acid esters of sorbitol, sorbitan and isosorbide. More specifically, the class includes the ethoxylated fatty acid monoesters, diesters and triesters of sorbitol and the monoesters and diesters of sorbitan and isosorbide.

The fatty acids which may be used to prepare the ethoxylated esters of sorbitol, sorbitan and isosorbide are, in general, those having from about 12 to about 22 carbon atoms and comprise such acids as stearic acid, palmitic acid, lauric acid, oleic acid and behenic acid. Saturated fatty acids having more than 12 carbon atoms are preferred.

The polyoxyethylene derivatives of the sorbitan and isosorbide fatty acid esters (either mono- or diesters are operative) may be prepared by reacting the sorbitan or isosorbide with ethylene oxide prior to esterification, known in the art as dendrizing or by preparing a partial sorbitan or isosorbide fatty acid ester first and then reacting that fatty acid ester with ethylene oxide, known in the art as catenylating. The preparation of polyoxyethylene fatty acid esters of sorbitan and isosorbide is described and exemplified in the U.S. patent to William C. Griffin, Pat. No. 2,380,166, issued July 10, 1945, hereby incorporated by reference.

The ethoxylated sorbitol fatty acid esters may be prepared according to one method described and exemplified in the U.S. patent to Schmidt et al., Pat. No. 1,959,930, hereby incorporated by reference and according to another method by first preparing the higher fatty acid partial ester of sorbitol and then ethoxylating the ester in the conventional manner. The fatty acid partial ester of sorbitol may be prepared by transesterification of the hexitol and the ester of a monohydric alcohol and a fatty acid. A variety of solvents may be used for the transesterification reaction such as dimethylformamide (DMF), pyridine, dimethyl sulfoxide and other suitable organic solvents.

Potassium carbonate may be used as a catalyst in the transesterification reaction, as may also sodium methoxide and sodium hydroxide. The rate of reaction depends to an important degree upon the dissolution of the catalyst. The transesterification reaction may be modified by adding the catalyst to the reaction mixture as a solution in methanol. The methanol is then removed under reduced pressure to leave a homogeneous reaction mixture. The rate of reaction also depends upon the removal of the methanol formed during the reaction and the purity of the alkyl ester of higher fatty acid used. The presence of free fatty acid neutralizes the catalyst and thus reduces the rate of reaction. The progress of the transesterification reaction may be followed by the amount of methanol collected during the reaction, or, more precisely, by taking aliquot portions of the reaction mixture at intervals and analyzing for the unreacted fatty acid ester by gas liquid chromatography.

The following is an example of the preparation of a higher fatty acid partial ester of sorbitol:

EXAMPLE 1

Preparation of sorbitol distearate

One mole sorbitol (pellets) and 900 ml. dimethylformamide were placed in a 3-necked flask equipped with thermometer, mechanical stirrer, (10") Vigreux column and condenser. The mixture was heated with stirring until the sorbitol was completely dissolved (approximately 34° C.).

Twelve grams anhydrous $K_2CO_3$ was dissolved in 50–75 ml. methanol in a steam bath and the solution added to the reaction mixture. Methanol was then removed by distillation. (The catalyst can be added as a solid as well as a methanolic solution.) After removal of the methanol, two moles methyl stearate were added and the reaction mixture reacted at 90° C. When approximately 35% methyl stearate is reacted, the temperature can be raised up to 130–135° C. The temperature should not exceed 135° C. to avoid anhydrizing the sorbitol. The reaction time for different preparations varied from 10–12 hours to several days. Periodically, vacuum was applied to remove the methanol liberated during the reaction.

The progress of the reaction was followed by taking samples periodically and analyzing for unreacted methyl stearate by gas liquid chromatography. When the unreacted methyl stearate was below 5%, the solvent was removed under high vacuum, being careful not to exceed 135° C. pot temperature.

Analyses:
    Saponification No.—136
    Hydroxyl No.—306
    Acid No.—3.4

One ml. sample was taken from the reaction mixture and placed in a 25 ml. Erlenmeyer flask which contained 15 ml. of 10–15% NaCl solution. The methyl stearate was then extracted with 5 ml. ether and was analyzed by GLC with a 4 foot, 25% D.E.G.S. column at 200° C.

In the polyoxyethylene derivatives of sorbitol, sorbitan or isosorbide fatty acid esters, the mole ratios of ethylene oxide to sorbitol, sorbitan or isosorbide fatty acid ester may vary from as low as about 4/1 to as high as about 40/1, as designated polyoxyethylene (4–40) sorbitol, sorbitan or isosorbide fatty acid ester, with a 10/1 to 20/1 mole ratio a preferred range.

Representative of the polyoxyethylene derivatives of sorbitol, sorbitan or isosorbide fatty acid esters which may be used as a hydrophilic constituent of the emulsifier blend suitable for use in a process of continuous bread making according to the method of the present invention are polyoxyethylene sorbitol distearate, polyoxyethylene sorbitan monostearate, polyoxyethylene isosorbide dipalmitate, polyoxyethylene sorbitol distearate, polyoxyethylene isosorbide monooleate, polyoxyethylene sorbitol tristearate, polyoxyethylene sorbitan dibehenate, polyoxyethylene isosorbide monostearate, polyoxyethylene sorbitan monolaurate, polyoxyethylene sorbitan monopalmitate, polyoxyethylene sorbitol oleate, as well as other similar ethoxylated fatty acid esters of sorbitol, sorbitan and isosorbide.

The emulsifier blend useful in the preparation of yeast-raised baked products according to the method of the present invention may be easily prepared by mixing with suitable agitation a monoglyceride of the kind hereinbefore described and a polyoxyethylene derivate of a sorbitol, sorbitan or isosorbide fatty acid ester. The resulting blend is usually, although not necessarily, a plastic mass which is easily dispersed in the dough or in the shortening. In the continuous breadmaking process, the blend may be dispersed in liquid brew or liquid sponge or in the shortening which is generaly added to the brew or liquid sponge concurrently with the flour to form the pre-mix dough. The emulsifier blend may comprise as high an amount as about 80% by weight monoglyceride and as little an amount of about 20% by weight polyoxyethylene sorbitol, sorbitan or isosorbide fatty acid ester or as little an amount as about 40% by weight monoglyceride and as high an amount as about 60% by weight polyoxyethylene sorbitol, sorbitan or isosorbide fatty acid ester.

The emulsifier blend, when used in a method of continuous bread making according to the present invention, may also be dispersed in a liquid emulsion which may be metered into the blending tank or brew tank if desired. Optimally, the emulsifier blend is incorporated into the bread dough in either the batch or the continuous breadmaking process in an amount equivalent to about 0.25% based upon the weight of the flour in the dough. Ordinarily, the emulsifier blend is incorporated into the bread dough within a range of about 0.15% to about 1.0% based upon the weight of the flour in the dough.

EXAMPLES 2-4

In the following examples three different mono- and diglyceride mixtures blended with polyoxyethylene(20) sorbitan monostearate were used to prepare bread and compared with a control bread containing no emulsifier and a bread containing a mono- and diglyceride mixture alone. The following monoglycerides were used: mono- and diglycerides of fat-forming fatty acids (ca. 56% alpha mono) from a lard and tallow blend, hereinafter designated monoglyceride A; mono- and diglycerides of fat-forming fatty acids (ca. 56% alpha mono) from partially hydrogenated tallow, hereinafter designated monoglyceride B; mono- and diglycerides of fat-forming fatty acids (ca. 54% alpha mono) from hydrogenated soybean oil, hereinafter designated monoglyceride C and mono- and diglycerides of fat-forming fatty acids (ca. 54% alpha mono) from hydrogenated tallow, hereinafter designated monoglyceride D.

The following bread formula and procedures were utilized to evaluate the three monoglyceride/polyoxyethylene (20)sorbitan monostearate blends and the control and comparison breads.

BREAD FORMULA

|  | Grams | Percent (flour as 100) |
|---|---|---|
| Sponge: | | |
| Flour | 865.0 | 65 |
| Water | 493.0 | [1] 37.2 |
| Yeast | 33.3 | 2.5 |
| Yeast Food | 6.6 | 0.5 |
| Dough: | | |
| Flour | 465 | 35 |
| Sugar | 106.3 | 8 |
| Salt | 26.6 | 2 |
| Shortening (Lard) | 40.0 | 3 |
| Non Fat Dry Milk Solids | 80.0 | 6 |
| Water | 372.0 | [1] 28.2 |
| Emulsifier | 3.3-6.6 | 0.25-0.5 |

[1] Variable.

57% of the total water in the above formula was added to the sponge and 43% of the total water was added to the dough. The total amount of water used varied depending upon the flour absorption properties. The amount of water required was determined by a farinograph method which is described in Cereal Laboratory Methods compiled by American Association of Cereal Chemists, 6th Edition, pp. 132-139.

Procedure

All ingredients are at room temperature (approximately 75° F.). The sponge ingredients are kneaded in a 10 qt. Hobart bowl, utilizing a standard dough hook, for 5 minutes at low speed. The yeast and yeast food are dissolved first in part of the sponge water, and added as liquids. The dough is fermented 4.5 hours at 86° F. and 75% R.H.

The fermented sponge is added to the mixer. Add the dough water. Place ½ of the dough flour on top of $H_2O$ and add all other ingredients except the shortening. Mix 2 minutes at medium speed. Add remainder of flour and shortening. The dough is mixed approximately 8 minutes more on medium speed—depending on the Farinograph results and flour used.

The dough is then fermented for 20 minutes at 86° F., 75% R.H.

After fermentation, the dough is divided into 18 ounce pieces, rounded, placed into bread pans and allowed a 10 minute proof at 86° F., 75% R.H.

After proofing, the dough is sheeted, moulded, sealed and placed into bread pans. The dough is then proofed at 100° F., 85% R.H. to template height (approximately 1⅛ inches in 55 to 60 minutes).

Bake at 425° F. for 20 minutes.

The volume (in cc.) of each loaf is measured in a loaf volumeter [1] approximately 1 hour after baking. The loaves are then wrapped in cellophane (#300 MSD 53), sealed, and stored at room temperature (ca. 76° F., 50% R.H.) for a period of 6 days.

After 3 days and 6 days of storage, the loaves are sliced (½ inch slices), using an Oliver Slicing Machine (#777). The middle five slices are used for testing on the Instron [2] electronic compressometer—the end slices are not used. Three readings are taken on each of the 5 slices—one in upper corner within ½" of crust, another on center of slice, and the third at the opposite bottom corner (½" from bottom and sides). The slices are then observed for crumb, grain, texture, color, and other visible characteristics.

In determining the Instron values, the three readings per slice are averaged and then the values for the five slices are averaged to give a specific number for softness on that particular day. To calculate the softness index, with 1.00 for the control (unemulsified) bread, use the following calculation:

$$\text{Softness Index} = \frac{\text{Reading of experimental sample}}{\text{Reading of control sample}}$$

Tables I and II which follow exemplify the results of the evaluation of the above-indicated monoglyceride/

---

[1] Method of volumetric measurement described in Cereal Laboratory Methods of American Association of Cereal Chemists, 17th ed., method 10—10, using apparatus similar to that described in Cereal Chemistry, VIII:307 (1930) or Cereal Chemistry, XV: 235 (1938).
[2] Instron model TM, standard speed, manufactured by Instron Corp.:

Compression load cell #CB
Full scale load—1000 grams
Compressibility distance—4 mm. (0.16 inch)
Compression plunger disc—1 inch diameter
Crosshead speed—(5 inches per minute)
Chart speed—(20 inches per minute)

polyoxyethylene(20)sorbitan monostearate blends as softeners when compared with a control bread and a conventional softener:

EXAMPLES 8-10

Bread was prepared according to the method of the

TABLE I

| | Ratio | Percent emulsifier on flour weight | Dough condition | Proof time | Volume average, cc. | Instron | | | | | | | | |
|---|---|---|---|---|---|---|---|---|---|---|---|---|---|---|
| | | | | | | Softness readings | | | Softness index | | | Grain | | |
| | | | | | | 3 days | 6 days | Avg. | 3 days | 6 days | Avg. | 3 days | 6 days | Avg. |
| Control | | | V. Good | 64 | 2,644 | 183 | 283 | 233 | 1.00 | 1.00 | 1.00 | Good | Good | Good. |
| Monoglyceride A | | 0.5 | do | 64 | 2,627 | 174 | 246 | 210 | .95 | .87 | .91 | do | do | Do. |
| Monoglyceride B/ polyoxyethylene (20)sorbitan monostearate | 60/40 | 0.5 | do | 65 | 2,860 | 145 | 208 | 177 | .79 | .74 | .76 | do | Good+ | Do. |
| Monoglyceride C/ polyoxyethylene (20)sorbitan monostearate | 60/40 | 0.5 | do | 64 | 2,894 | 138 | 197 | 168 | .75 | .69 | .72 | Fair+ | do | Do. |
| Monoglyceride D/ polyoxyethylene (20)sorbitan monostearate | 60/40 | 0.5 | do | 64 | 2,845 | 150 | 213 | 182 | .82 | .75 | .78 | Good+ | do | Good+. |

TABLE II

| | Ratio | Percent emulsifier on flour weight | Dough condition | Proof time | Volume average, cc. | Instron | | | | | | | | |
|---|---|---|---|---|---|---|---|---|---|---|---|---|---|---|
| | | | | | | Softness readings | | | Softness index | | | Grain | | |
| | | | | | | 3 days | 6 days | Avg. | 3 days | 6 days | Avg. | 3 days | 6 days | Avg. |
| Control | | | V. Good | 61 | 2,578 | 230 | 304 | 268 | 1.00 | 1.00 | 1.00 | Good | Good+ | Good+. |
| Monoglyceride A | | 0.5 | do | 64 | 2,608 | 175 | 274 | 234 | 0.76 | 0.90 | 0.84 | do | (1) | (1). |
| Monoglyceride B/ polyoxyethylene (20)sorbitan monostearate | 60/40 | 0.25 | do | 63 | 2,805 | 173 | 234 | 204 | 0.75 | 0.78 | 0.76 | do | (1) | Good+. |
| Monoglyceride C/ polyoxyethylene (20)sorbitan monostearate | 60/40 | 0.25 | do | 65 | 2,739 | 181 | 252 | 217 | 0.79 | 0.84 | 0.82 | do | Good+ | Do. |
| Monoglyceride D/ polyoxyethylene (20)sorbitan monostearate | 60/40 | 0.25 | do | 64 | 2,744 | 177 | 242 | 210 | 0.76 | 0.80 | 0.78 | do | (1) | Do. |

[1] V. Good.

EXAMPLES 5-7

The following are further examples of a yeast-raised baked product prepared according to the method of the present invention conforming to the bread formula and procedures set forth in Examples 2-4 save only that the level of emulsifier blend in the formula were varied between 0.1% of emulsifier blend based on the flour weight to 0.5% of emulsifier blend based on the flour weight. The emulsifier blend comprised 60% by weight of a monoglyceride hereinbefore identified as monoglyceride B and 40% by weight of polyoxyethylene(20)sorbitan monostearate. A control bread containing no emulsifier was prepared according to same bread formula and procedures. The comparative results are set forth below in Table III.

present invention in a series of bakings according to the formula and procedures set forth in Examples 2-4 wherein an emulsifier blend of monoglyceride B and polyoxyethylene(20) sorbitan monostearate in a 60:40 parts by weight ratio was used at levels of concentration based on flour weight of 0.25%, 0.40% and 0.5%. The results were compared to bread made according to the same formula and procedures containing monoglyceride A alone at a level of concentration of 0.5% by weight of the flour present. A control bread was also prepared according to the same formula and procedures which contained no emulsifier.

TABLE III

| | Ratio | Percent emulsifier on flour weight | Dough handling | Proof time | Volume average, cc. | Dough condition | Instron | | | | | | Grain |
|---|---|---|---|---|---|---|---|---|---|---|---|---|---|
| | | | | | | | Softness reading | | | Softness index | | | |
| | | | | | | | 3 days | 6 days | Avg. | 3 days | 6 days | Avg. | |
| Control | | | V. Good | 60 | 2,619 | | 239 | 333 | 286 | 1.00 | 1.00 | 1.00 | V. Good. |
| Monoglyceride B/polyoxyethylene (20) sorbitan monostearate | 60/40 | 0.1 | do | 60 | 2,699 | 80 | 221 | 293 | 257 | 0.93 | 0.88 | 0.91 | Do. |
| Do | 60/40 | 0.15 | do | 60 | 2,763 | 144 | 176 | 270 | 223 | 0.74 | 0.81 | 0.78 | Do. |
| Do | 60/40 | 0.2 | do | 60 | 2,806 | 187 | 191 | 286 | 239 | 0.80 | 0.86 | 0.83 | Do. |
| Do | 60/40 | 0.25 | do | 60 | 2,865 | 246 | 199 | 289 | 244 | 0.83 | 0.87 | 0.85 | Do. |
| Do | 60/40 | 0.3 | do | 60 | 2,960 | 341 | 179 | 263 | 221 | 0.75 | 0.79 | 0.77 | Do. |
| Do | 60/40 | 0.35 | do | 60 | 2,766 | 147 | 196 | 228 | 222 | 0.82 | 0.68 | 0.75 | Do. |
| Do | 60/40 | 0.4 | do | 60 | 2,905 | 286 | 163 | 259 | 211 | 0.68 | 0.78 | 0.73 | Good.+ |
| Do | 60/40 | 0.45 | do | 60 | 2,903 | 284 | 158 | 240 | 299 | 0.66 | 0.72 | 0.69 | Do. |
| Do | 60/40 | 0.5 | do | 60 | 2,874 | 255 | 156 | 245 | 201 | 0.65 | 0.74 | 0.70 | V. Good. |

The comparative results are set forth below in Table IV.

TABLE IV

| No. of Bakings | Polyoxyethylene derivative | Level,[1] percent | Mono and diglyceride % | Level,[1] percent | Volume,[2] inc. percent | Softness Index[3] Rank | 3 days | 6 days | Grain | Dough handling | Proof time, minutes |
|---|---|---|---|---|---|---|---|---|---|---|---|
| 61 | None (control) | | None | | | 7 | 1.00 | 1.00 | V.G. | V.G. | 63 |
| 22 | None | | Monoglyceride A | 0.5 | 1.6 | 6 | .82 | .85 | V.G. | V.G. | 63 |
| 51 | Polyoxyethylene(20) sorbitan monostearate | 0.10 | Monoglyceride B | 0.15 | 5.4 | 4 | .84 | .85 | V.G. | V.G. | 64 |
| 5 | do | 0.16 | do | 0.24 | 10.2 | 1 | .77 | .80 | V.G. | V.G. | 60 |
| 48 | do | 0.20 | do | 0.30 | 7.4 | 2 | .76 | .76 | V.G. | V.G. | 64 |

[1] Percent emulsifier on flour weight.

[2] Percent volume increase = $\dfrac{\text{Avg. Volume Increase (cc.) (Baked Same Day)}}{\text{Avg. Control Volume (cc.)}}$

[3] Softness index = $\dfrac{\text{Instron Reading Test Loaf (Baked Same Day)}}{\text{Instron Reading Control Loaf}}$ In recent years, the traditional "batch" method of producing bread has been supplanted in numerous bakeries by continuous bread-making processes which have been developed for the continuous production of finished loaves of bread. In these processes, the essential ingredients of the bread are fed continuously into automatic apparatus for the production of bread dough wherein, blending, fermentation and mixing of said ingredients into a suitable bread dough is accomplished, after which the dough is itself automatically divided and panned ready for baking. In a typical continuous bread making process, for example, a brew or broth is prepared by blending together water, yeast, yeast food and liquid sugar and passing the resulting mixture to a "brew tank" where it is allowed to ferment for the production of flavor in the end product. Thereafter, the resulting brew is passed through successive stages into a flour incorporator wherein shortening and flour are added to the brew and preliminarily mixed therewith under pressure to form a homogeneous mass called a pre-mix. The pre-mix is then pumped under pressure into a developer wherein the pre-mix is subjected to vigorous mixing to develop it into a uniform properly finished dough. Finally, the dough is passed to a dividing and panning device wherein it is accurately divided and panned.

Not infrequently the above-described process is modified by the addition of salt, milk, more sugar and up to about 50% of the flour to the brew tank to form a liquid "sponge" which may be in part recycled to "seed" the following brew prior to its passage to a liquid sponge trough where additional liquid sugar is added to insure the presence of unfermented sugar in the liquid sponge. The liquid sponge may then be passed through a heat exchanger to the incorporator where the balance of the flour is added and the pre-mix formed.

The following are specific examples of a process of continuous bread-making according to the method of the present invention:

EXAMPLES 11–12

The process is carried out in continuous bread-making equipment which comprises an initial blending tank, holding tanks for the brew, a heat exchanger, an oxidant tank, a shortening tank and a flour feeder or hopper communicating with an incorporator or pre-mixer, a developer or high speed mixer, and finally a divider and panner. Each of the foregoing elements positioned in the order stated, communicates with adjacent elements by means of conduits adapted for the passage therethrough of bread dough ingredients. The conduits are supplied with suitable pumps for moving said ingredients through said conduits.

The following bread formula is used for the continuous production of bread through the equipment described above:

BREW FORMULA

| Ingredient: | Percent | Grams |
|---|---|---|
| Flour | 30 | 1,800 |
| Water | 67 | 4,020 |
| Sugar | 8 | 480 |
| Non-fat dry milk | 2 | 120 |
| Yeast | 2.5 | 150 |
| Salt | 2.3 | 138 |
| Non-phosphate yeast food | 0.5 | 30 |
| Calcium acid phosphate | 0.2 | 12 |
| Calcium propionate | 0.1 | 6 |

The brew is allowed to ferment in the holding tanks for a period of 2½ hours at a temperature of 86° F.

DOUGH FORMULA

| Ingredient: | Percent | Grams |
|---|---|---|
| Flour | 70 | 4,200 |
| Water | 3.25 | 195 |
| Shortening | 3.0 | 180 |
| Emulsifier blend | 0.25 (0.50) | 15 (30) |
| Oxidation solution: potassium bromate | 50 p.p.m. | |
| Oxidation solution: potassium iodate | 12.5 p.p.m. | |

The shortening comprises 94.03% lard and 5.97% fully hydrogenated cottonseed flakes. The emulsifier composition is a blend of 60% by weight of a monoglyceride which comprises monoglycerides and diglycerides (ca. 56% alpha mono) of fat forming fatty acids from hydrogenated tallow and 40% polyoxyethylene(20)sorbitan monostearate. The shortening and emulsifier blends are blended together to form a homogeneous mass by melting the emulsifier into the shortening.

Bread is made according to the formula set forth above in a continuous bread-making process wherein ingredients of the brew formula after fermentation are passed through a heat exchanger to an incorporator in which a pre-mix is made by the addition of the ingredients of the dough formula. The pre-mix is passed to the developer (175 r.p.m.) where the final dough is formed by vigorous mixing. After dividing and panning, the dough is baked at 410° F. for 18 minutes.

A control dough is made by the same continuous bread making processes using the same ingredients in the same proportions except that no emulsifier is used. The comparative results are set forth below in Table V.

TABLE V

| Polyoxyethylene derivative | Level[1] | Mono and diglyceride | Level[1] | Spec. vol., cu. in./oz. | Dough appearance | Proof time | Break shred | Crust color | Grain | Texture | Crumb color | Flavor and aroma | Crumb[2] firmness, 2 days |
|---|---|---|---|---|---|---|---|---|---|---|---|---|---|
| None | | None | | 9.0 | V.G. | 46 | V.G. | O.K. | V.G. | G+ | O.K. | O.K. | 8.9 |
| | | | | 9.0 | V.G. | 52 | G+ | O.K. | V.G. | G° | O.K. | O.K. | 8.7 |
| Polyoxyethylene (20)sorbitan monostearate | 0.10 | Monoglyceride B. | 0.15 | 9.3 | V.G. | 45 | V.G. | O.K. | V.G. | V.G.- | O.K. | O.K. | 8.3 |
| | | | | 9.3 | V.G. | 51 | V.G. | O.K. | E. | V.G. | O.K. | O.K. | 8.4 |
| | | | | 9.6 | V.G. | 52 | V.G. | O.K. | E. | V.G. | O.K. | O.K. | 8.8 |
| Do | 0.20 | do | 0.30 | 9.5 | V.G. | 43 | V.G. | O.K. | E. | V.G. | O.K. | O.K. | 8.0 |
| | | | | 9.7 | V.G. | 49 | V.G. | O.K. | E. | V.G. | O.K. | O.K. | 7.9 |

[1] Percent emulsifier on flour weight.  [2] Baker Compressimeter, grams/2 mm.

The following are further specific examples of antistalant emulsifier compositions which may be used in the preparation of a yeast-raised baked product according to the methods of the present invention.

EXAMPLES 13-21

| Emulsifier composition | Ratio | Concentration [1] |
|---|---|---|
| Monoglyceride A/polyoxyethylene(10)sorbitan monopalmitate | 50/50 | 0.25 |
| Monoglyceride B/polyoxyethylene(30)sorbitan tristearate | 70/30 | 0.15 |
| Monoglyceride A/polyoxyethylene(20)monooleate | 80/20 | 0.50 |
| Monoglyceride C/polyoxyethylene(40)sorbitan tristearate | 45/55 | 0.30 |
| Monoglyceride D/polyoxyethylene(8)sorbitol distearate | 75/25 | 0.20 |
| Monoglyceride B/polyoxyethylene(25)sorbitol tallow ester | 65/35 | 0.25 |
| Monoglyceride C/polyoxyethylene(35)sorbitol laurate | 40/60 | 0.50 |
| Monoglyceride B/polyoxyethylene(8)isosorbide distearate | 55-45 | 0.40 |
| Monoglyceride C/polyoxyethylene(30)isosorbide dipalmitate | 50/50 | 0.35 |

[1] Percent emulsifier based on flour weight in product.

Having thus described our invention, we claim:

1. In a method of preparing a bread product containing not more than about 5% shortening and not more than about 8% residual sugar, the improvement which comprises adding to the dough ingredients from about 0.15% to about 1.0% by weight of flour in said ingredients of an emulsifier blend comprising from about 40% by weight to about 80% by weight of a monoglyceride and from about 20% by weight to about 60% by weight of a polyoxyethylene derivative selected from the group consisting of ethoxylated fatty acid partial esters of sorbitol, ethoxylated fatty acid partial esters of sorbitan and ethoxylated fatty acid partial esters and complete esters of isosorbide, the fatty acid moiety of said esters being derived from fatty acids containing from about 12 to about 22 carbon atoms and the mole ratio of ethylene oxide in said polyoxyethylene derivative to said derivative being within the range of about 4 to 1 to about 40 to 1.

2. A method according to claim 1 wherein said monoglyceride is prepared from fat-forming fatty acids from partially hydrogenated tallow.

3. A method according to claim 1 wherein said polyoxyethylene derivative is polyoxyethylene(20)sorbitan monostearate.

4. In a method of continuous production of a bread product containing not more than about 5% shortening and not more than about 8% residual sugar which involves the stages of forming a brew or liquid sponge, allowing the same to ferment and passing it to a flour and shortening incorporator for pre-mixing into bread dough, the improvement which comprises adding to the dough ingredients from about 0.15% to about 1.0% by weight of flour in said ingredients of an emulsifier blend comprising from about 40% by weight to about 80% by weight of a monoglyceride and from about 20% by weight to about 60% by weight of a polyoxyethylene derivative selected from the group consisting of ethoxylated fatty acid partial esters of sorbitol, ethoxylated fatty acid partial esters of sorbitan and ethoxylated fatty acid partial esters and complete esters of isosorbide, the fatty acid moiety of said esters being derived from fatty acids containing from about 12 to about 22 carbon atoms and the mode ratio of ethylene oxide in said polyoxyethylene derivative to said derivative being within the range of about 4 to 1 to about 40 to 1.

5. A method according to claim 4 wherein said emulsifier blend is added to the shortening prior to incorporation with the remaining ingredients.

6. A method according to claim 4 wherein said emulsifier blend is added directly to the brew or liquid sponge.

7. A method according to claim 1 wherein said monoglyceride is prepared from fat-forming fatty acids selected from the group consisting of stearic acid, palmitic acid and oleic acid.

References Cited

UNITED STATES PATENTS

| 2,968,564 | 1/1961 | Schroeder et al. | 99—118 |
| 3,117,010 | 1/1964 | Geisler | 99—118 |
| 3,272,634 | 9/1966 | Koren et al. | 99—90 |

OTHER REFERENCES

Pyler: "Baking Science and Technology," vol. II, pp. 767–768, Seibel Publishing Co., Chicago, 1952.

ALVIN E. TANENHOLTZ, Primary Examiner

J. R. HOFFMAN, Assistant Examiner

U.S. Cl. X.R.

99—118